US012330388B2

(12) United States Patent
Haight et al.

(10) Patent No.: US 12,330,388 B2
(45) Date of Patent: Jun. 17, 2025

(54) METHOD AND APPARATUS FOR WIND TURBINE BLADE PRODUCTION FLANGE TRIMMING

(71) Applicant: Vestas Wind Systems A/S, Aarhus (DK)

(72) Inventors: Jeremy Haight, Arvada, CO (US); Thomas Brink, Divide, CO (US); Zachary Bibik, Boulder, CO (US)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 18/720,735

(22) PCT Filed: Dec. 12, 2022

(86) PCT No.: PCT/DK2022/050276
§ 371 (c)(1),
(2) Date: Jun. 17, 2024

(87) PCT Pub. No.: WO2023/110041
PCT Pub. Date: Jun. 22, 2023

(65) Prior Publication Data
US 2025/0050608 A1    Feb. 13, 2025

Related U.S. Application Data

(60) Provisional application No. 63/290,835, filed on Dec. 17, 2021.

(30) Foreign Application Priority Data

Jan. 12, 2022    (DK) .......................... PA 202270016

(51) Int. Cl.
B29C 70/54    (2006.01)
B29D 99/00    (2010.01)
B29L 31/08    (2006.01)

(52) U.S. Cl.
CPC ........ *B29D 99/0028* (2013.01); *B29C 70/545* (2013.01); *B29C 2793/009* (2013.01); *B29L 2031/085* (2013.01)

(58) Field of Classification Search
CPC .......................... B29D 99/0028; B29C 70/545
See application file for complete search history.

(56) References Cited

U.S. PATENT DOCUMENTS

2010/0332016 A1    12/2010    Abrams et al.

FOREIGN PATENT DOCUMENTS

CN    202846792 U  *  4/2013
CN    206335630       7/2017
(Continued)

OTHER PUBLICATIONS

English translation CN 202846792 (Year: 2013).*
(Continued)

*Primary Examiner* — Jason L Vaughan
*Assistant Examiner* — Amanda Kreiling
(74) *Attorney, Agent, or Firm* — Wood Herron & Evans LLP

(57) ABSTRACT

A method of trimming a production flange (52) from a wind turbine blade (10) during manufacture of the wind turbine blade (10). The method comprises mounting a self-propelled flange trimming apparatus (60) on the production flange (52) and using a drive system (64, 66) of the apparatus (60) to propel the apparatus (60) along the production flange (52). A directional control system controls the direction of the apparatus (60) and a cutting tool (81) cuts through the production flange (52) as the apparatus (60) travels along the production flange (52). Also, a self-propelled production flange trimming apparatus (60) comprising a carriage (61) with a drive member (64, 66), a directional control system, and a cutting tool (81) attached to the carriage (61). A system (Continued)

comprising a wind turbine blade moulding (50) and a trimming apparatus (60) mounted on the production flange (52) of the moulding (50).

15 Claims, 6 Drawing Sheets

(56) References Cited

FOREIGN PATENT DOCUMENTS

| | | |
|---|---|---|
| CN | 109501084 | 3/2019 |
| CN | 112248323 | 1/2021 |

OTHER PUBLICATIONS

Danish Patent and Trademark Office, technical examination issued in corresponding DK Application No. PA 2022 70016 dated Jun. 22, 2022.
International Searching Authority, International Search Report and Written Opinion issued in corresponding PCT Application No. PCT/DK2022/050276 dated Mar. 15, 2023.

\* cited by examiner

METHOD AND APPARATUS FOR WIND TURBINE BLADE PRODUCTION FLANGE TRIMMING

TECHNICAL FIELD

The present disclosure relates to a method, an apparatus and a system for trimming the production flange from a wind turbine blade moulding during manufacture of a wind turbine blade.

BACKGROUND

Modern wind turbine blades typically comprise a blade shell enclosing a structural spar or shear web. Some blade shells include structural elements. Blade shells are usually made by joining together moulded suction side and pressure side elements which are fabricated from fibrous composite materials and which may include a number of different materials including glass fibre, carbon fibre, balsa wood and polyurethane foam. Each blade shell moulded element is fabricated by laying-up the various materials in a blade shell production mould before infusing the materials with a resin under pressure and allowing the resin to cure.

Wind turbine blade shell mouldings are typically formed by bonding two half-shell mouldings together while they remain in their respective production moulds. To achieve this, one of the production moulds containing one of the half-shell mouldings is lifted and placed inverted on top of the other half-shell moulding still in its production mould. The peripheral edges of the two half-shell mouldings are then bonded together with an adhesive before de-moulding the complete blade shell moulding from the production moulds. Final finishing processes including trimming and polishing are then completed.

Each half-shell moulding typically comprises a spanwise extending production flange moulding which projects away from the main central body of the half-shell mouldings. Among other things, the production flanges facilitate the bonding process between the half-shell mouldings by providing increased surface area onto which the adhesive may be applied, and allowing for compressive force to be applied directly to the bond area without the need to apply force through the main central body of the half-shell mouldings which may cause damage.

After the complete blade shell moulding is de-moulded from the production moulds the production flanges are trimmed off as one of the blade finishing processes. This is typically done manually with a hand-held circular saw, a process which is both time consuming and tiring for the operator. Inaccuracies, and potentially even damage to the blade shell, may occur during the manual production flange trimming operation due to its reliance on human physical strength for both the progress and accuracy of the saw cut. It is against this background that the present disclosure has been developed.

SUMMARY OF THE INVENTION

The present invention provides a method of trimming a spanwise extending production flange from a wind turbine blade during manufacture of the wind turbine blade, the method comprising: mounting a self-propelled production flange trimming apparatus on a spanwise extending production flange of the wind turbine blade; using a drive system of the apparatus to propel the apparatus along the spanwise length of the production flange; using a directional control system of the apparatus to control the direction of the apparatus as it is propelled along the spanwise length of the production flange; and using a cutting tool of the apparatus to cut through the production flange to separate the production flange from the wind turbine blade as the apparatus is propelled along the spanwise length of the production flange.

The controlling of the direction of the apparatus may comprise following a first surface portion of the production flange with a follower mechanism of the apparatus. Herein the first surface portion may be a surface of a wall structure of the production flange, the wall structure itself or the opposite surfaces of the wall structure.

The follower mechanism comprises two or more follower wheels arranged to follow the opposite surfaces of the wall structure of the production flange and thereby the first surface portion. The capability to follow the first surface portion may be enabled by the configuration wherein the follower wheels are forced against the opposite surfaces of the first surface portion, i.e. the opposite surfaces of the wall structure of the production flange. In this way, the follower mechanism controls the direction of the apparatus in a merely passive way. However, the apparatus may additionally or alternatively comprise actuators for controlling the direction of the apparatus in dependence on the characteristic of the wind turbine blade and/or the production flange as detected by a detector.

The present invention is advantageous as the trimming apparatus is automatically driven and directed so that the trimming operation may be carried out more safely and repeatably with reduced risk of causing damage to the wind turbine blade.

Optionally, controlling the direction of the apparatus comprises detecting a characteristic of the wind turbine blade and/or the production flange and controlling the direction of the apparatus in dependence on the detected characteristic. This allows for the exact geometry of a particular wind turbine blade being trimmed to be used to control the direction of the trimming apparatus thereby avoiding the need for complex control systems and software.

Detecting a characteristic of the production flange optionally comprises detecting a characteristic of the production flange which is located on an outboard side of the production flange with respect to the wind turbine blade. The outboard side of the production flange provides a convenient location for characteristic detection as it is remote from the wind turbine blade surface which may be damaged by detection equipment, in particular detection equipment having a detector which requires physical contact.

Detecting a characteristic of the production flange may comprise detecting a first surface portion of the production flange. This is particularly advantageous when using a physical detector as the surface provides a specific area for the detector to bear against.

In one example, the first surface portion of the production flange is orientated at an angle with respect to a second surface portion of the production flange. Angled surfaces provide a clear distinction between the part of the production flange which is to be detected and the part that is not detected.

Optionally detecting the first surface portion of the production flange comprises following the first surface portion of the production flange with a follower mechanism of the apparatus. This provides a convenient method of surface characteristic detection.

The method optionally comprises detecting an end of the production flange and stopping propulsion of the apparatus upon detection of the end of the production flange to prevent the apparatus from falling off the production flange and causing damage to itself, to the wind turbine blade, or to other equipment and/or operators.

The method may comprise stopping or pausing propulsion of the apparatus along the spanwise length of the production flange; and cutting a portion of the production flange which has been separated from the wind turbine blade from a portion of the production flange that remains attached to the wind turbine blade. This allows the trailing portion of the trimmed production flange to be safely removed without interfering with the trimming operation.

In one example the method may comprise re-starting propulsion of the apparatus along the spanwise direction of the production flange so that the trimming operation may be continued once the trailing portion of the production flange has been removed.

In another aspect, the present invention provides a self-propelled wind turbine blade production flange trimming apparatus for trimming a spanwise extending production flange from a wind turbine blade during manufacture of the wind turbine blade, the apparatus comprising: a carriage; one or more drive members operatively attached to the carriage; a directional control system operatively attached to the carriage; and a cutting tool operatively attached to the carriage. This apparatus provides a self-contained, self-propelled, device for safely and accurately removing the production flange from a wind turbine blade moulding.

The directional control system may be arranged to control the direction of the apparatus by following a first surface portion of the production flange with a follower mechanism comprised by the apparatus. Further, the directional control system may comprise the follower mechanism.

Optionally the carriage comprises a hinge configured to allow a first side of the carriage to pivot with respect to a second side of the carriage. The hinge allows the apparatus to conform somewhat to the shape of the production flange as the apparatus moves along the production flange in use.

The carriage optionally has an open configuration suitable for use during placement of the apparatus onto the production flange of a wind turbine blade and/or removal of the apparatus from the production flange of the wind turbine blade, and a closed configuration suitable for use during a production flange cutting operation. This allows the apparatus to be mounted onto, and removed from, the production flange with greater ease.

In a further aspect the present invention provides a system for trimming a spanwise extending production flange from a wind turbine blade during manufacture of the wind turbine blade, the system comprising a wind turbine blade production flange trimming apparatus mounted on a spanwise extending production flange of a wind turbine blade, wherein the wind turbine blade production flange trimming apparatus comprises: a carriage releasably attached to the production flange; one or more drive members operatively attached to the carriage, wherein the one or more drive members are configured to propel the apparatus along the spanwise length of the production flange in use; a directional control system operatively attached to the carriage, wherein the directional control system is configured to control the direction of the apparatus as it is propelled along the spanwise length of the production flange in use; and a cutting tool operatively attached to the carriage, wherein the cutting tool is configured to cut through the production flange to separate the production flange from the wind turbine blade as the apparatus is propelled along the spanwise length of the production flange by the one or more drive members in use.

Optionally the directional control system comprises: a detector for detecting a characteristic of the wind turbine blade and/or the production flange; and an actuator, wherein the actuator is configured to control the direction of the apparatus in dependence on the characteristic of the wind turbine blade and/or the production flange as detected by the detector.

The detector is optionally configured to detect a first surface portion of the production flange, wherein the first surface portion of the production flange is contiguous with a second surface portion of the production flange, and wherein the first and second surface portions of the production flange are orientated at an angle with respect to one another.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

Embodiments of the invention will now be described, by way of example only, with reference to the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those of ordinary skill in the art to practice the invention. Other embodiments may be utilised, and structural changes may be made without departing from the scope of the invention as defined in the appended claims.

Figure 1:
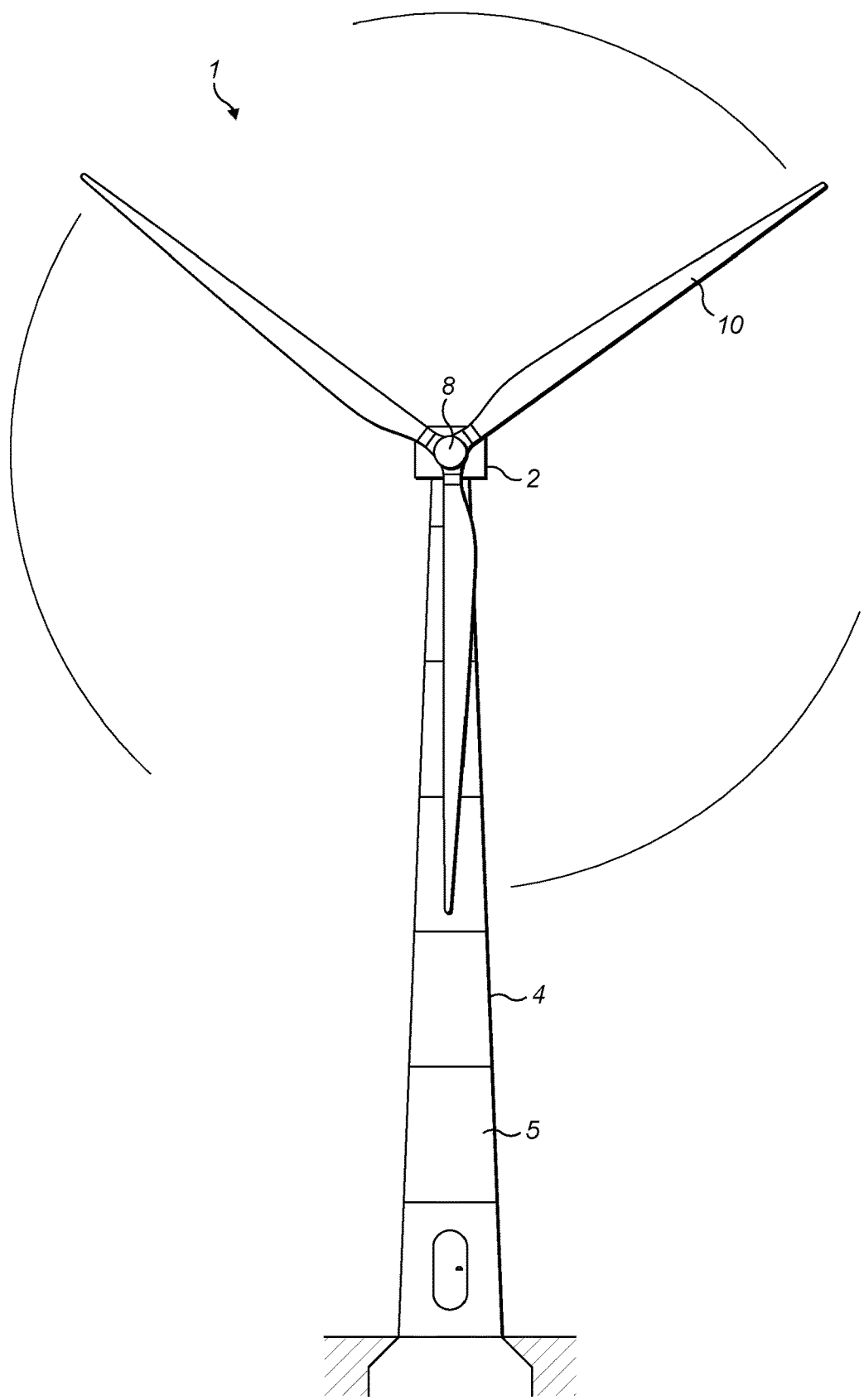
FIG. 1 shows a schematic view of a wind turbine.

FIG. 1 shows an example of a wind turbine 1. The example wind turbine 1 includes a nacelle 2 that is supported on a generally vertical tower 4, which itself comprises a plurality of tower sections 5. The nacelle 2 houses a number of functional components, including a gearbox and a generator (not shown), and supports a main rotor arrangement 6. The main rotor arrangement 6 comprises a hub 8 and a plurality of wind turbine blades 10 connected to the hub 8. In this example, the wind turbine 1 comprises three wind turbine blades 10.

Figure 2:
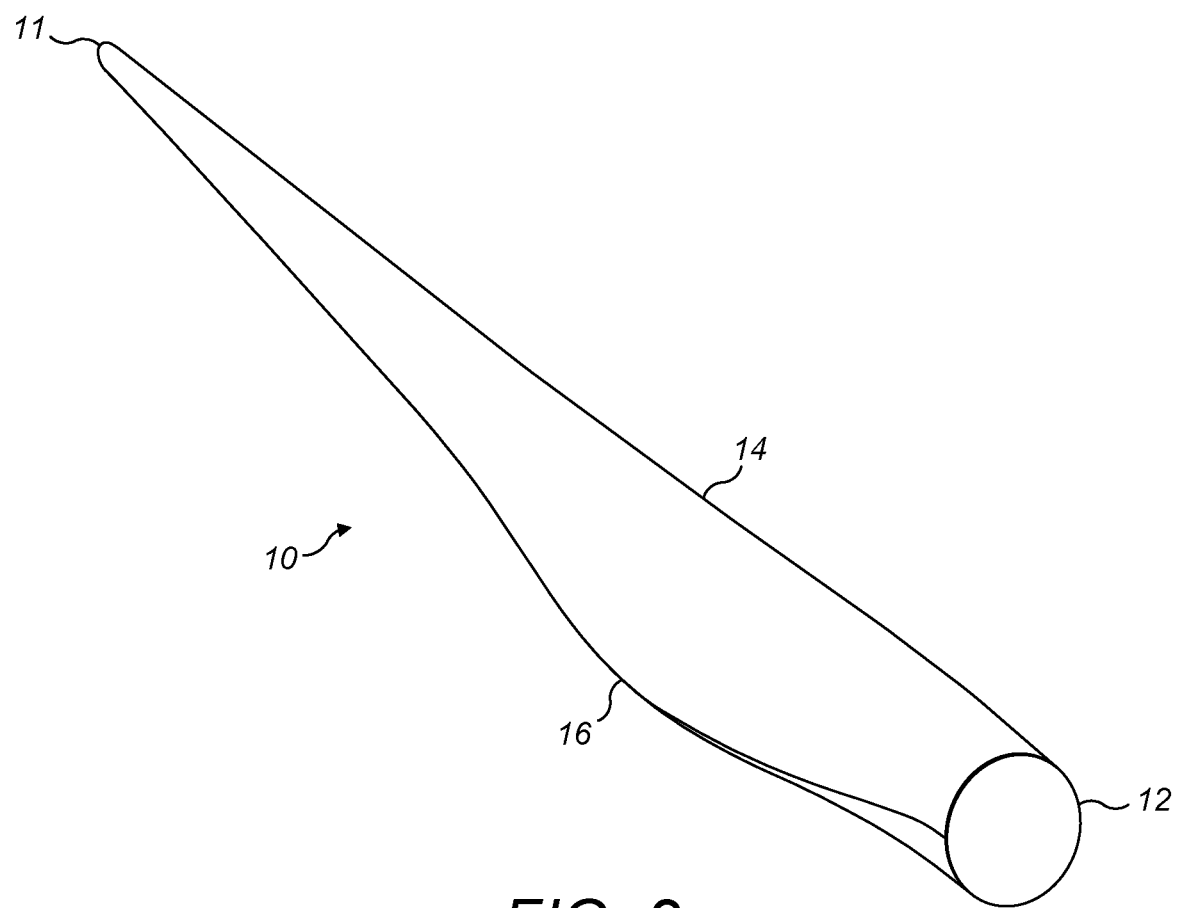
FIG. 2 shows a schematic isometric view of a wind turbine blade.

FIG. 2 shows a schematic isometric view of an example wind turbine blade 10. The example wind turbine blade 10 comprises a root end 12 and a tip end 11. The root end 12 is configured for attachment to the hub 8. A leading edge 14 and a trailing edge 16 extend between the root end 12 and the tip end 14 in a spanwise direction. A leeward blade shell section 20 extends from the leading edge 14 to the trailing edge 16 on the leeward side of the blade 10, and a windward blade shell section 22 extends from the leading edge 14 to the trailing edge 16 on the windward side of the blade 10. A windward shell section may also be known as a pressure side section. A leeward shell section may also be known as a suction side section.

Figure 3:
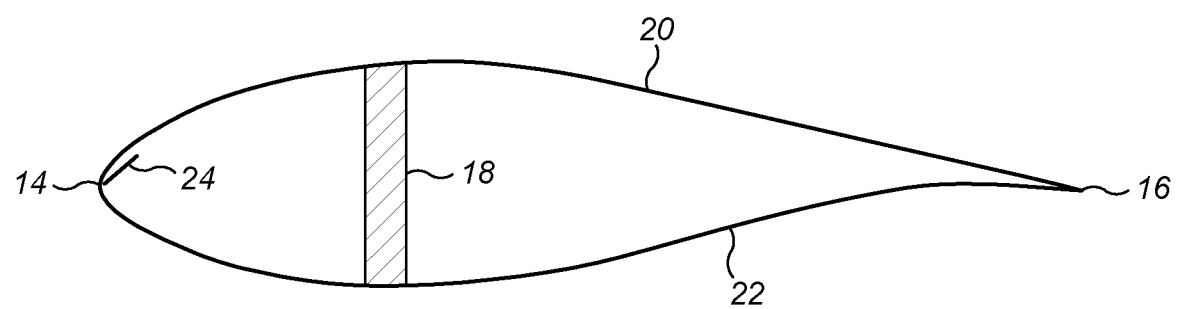
FIG. 3 shows a schematic view of a cross-section of the wind turbine blade of FIG. 2.

Referring now to FIG. 3, the wind turbine blade 10 may typically comprise a longitudinally, or spanwise, extending structural spar 18 which is located between the leeward blade shell section 20 and the windward blade shell section 22. A structural spar 18 may also be provided in the form of one or more shear webs.

Figure 4A:
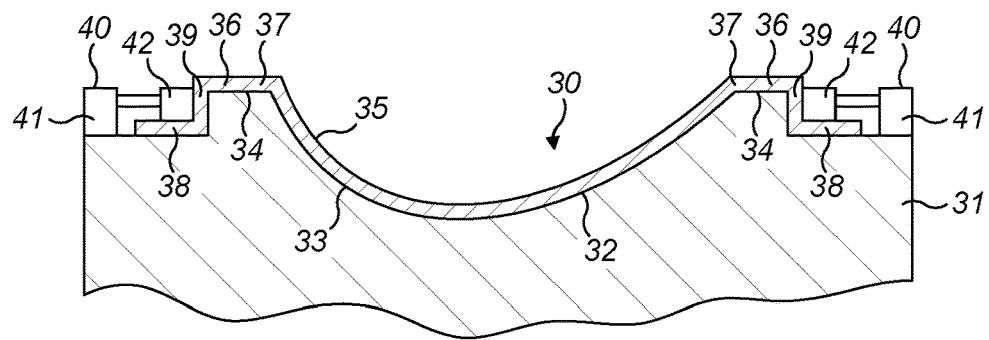
FIG. 4a shows a schematic sectional view of a first half-shell moulding located in a production mould.

FIG. 4a shows a schematic sectional view of an example first half-shell moulding 30 located in an example production mould 31. As shown in the example, the production mould 31 may have a production surface 32 onto which layers of material for forming the half-shell moulding 30 are laid before being infused with resin under pressure and cured. The production surface 32 may comprise a central portion 33 which corresponds in shape to the main body portion 35 of the half-shell moulding 30 (which will eventually form one side of the wind turbine blade shell). Two flange portions 34 may be located on either side of the central portion 33 outboard of the central portion 33.

The portions of the half-shell moulding 30 which are laid-up on the flange portions 34 of the production surface 32 may form spanwise extending production flange mouldings 36. The production flange mouldings 36 may each comprise a bond portion 37. The production flange mouldings 36 may also comprise anti-drop-out portions 38. The anti-drop-out portions 38 may be located outboard of the bond portions 37. The anti-drop-out portions 38 may be connected to the bond portions 37 by web portions 39 such that there is a difference in level between the bond portions 37 and the anti-drop-out portions 38. Optionally, the surface of the bond portions 37 may be contiguous with the surface of the anti-drop-out portions 38 such that there are no web portions 39.

Anti-drop-out devices 40 may be provided on each side of the production mould 31. The outboard ends 41 of the anti-drop-out devices 40 may be attached to the production mould 31. The inboard ends 42 of the anti-drop-out devices 40 may abut or connect to the anti-drop-out portion 38 of the production flange mouldings 36.

Figure 4B:
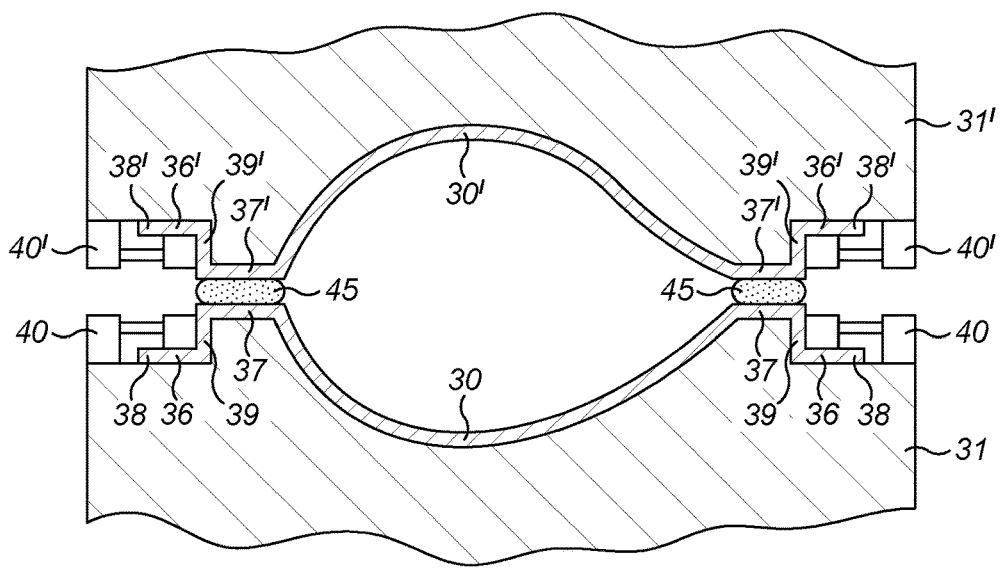
FIG. 4b shows a schematic sectional view of the first half-shell moulding of FIG. 4a during a bonding operation to a second half-shell moulding.

Referring to FIG. 4b, in one example to form a blade shell moulding 50 (see FIG. 4c) a second half-shell moulding 30' may be placed inverted on top of the first half-shell moulding 30 while both half-shell mouldings remain in their respective production moulds 31, 31'. An adhesive 45 (exaggerated for clarity) may be located between the bond portions 37, 37' of the production flange mouldings 36, 36' and allowed to cure.

The anti-drop-out devices 40, 40' may help to prevent the half-shell mouldings 30, 30' from moving with respect to the production moulds 31, 31' during the bonding process. In particular, the anti-drop-out devices 40' may help to prevent the second, or upper, half-shell moulding 30' from dropping-out of the production mould 31' during the lifting, inverting, bonding and curing steps.

It will be understood by a person skilled in the art that the assembly of the first, or lower, half-shell moulding 30 and production mould 31 may optionally not utilise anti-drop-out devices 40. In such cases, the production flange mouldings 36 of the first half-shell moulding 30 may only comprise bond portions 37. Alternatively, the production flange mouldings 36 of the first half-shell moulding 30 may comprise bond portions 37, anti-drop-out portions 38 and web portions 39 even if anti-drop-out devices 40 are not used.

Figure 4C:
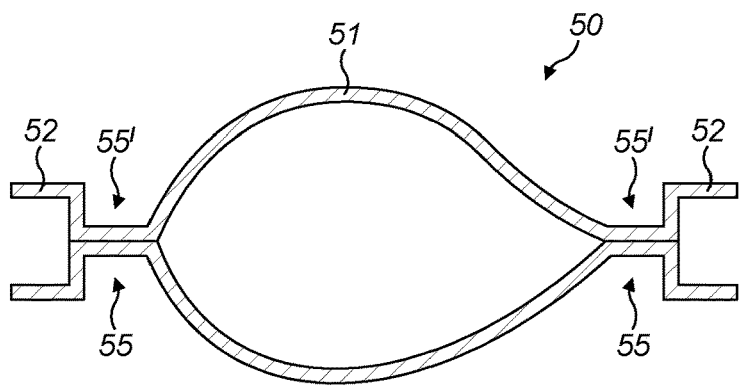
FIG. 4c shows a schematic sectional view of a complete blade shell moulding of when de-moulded from its production moulds.
Figure 5:
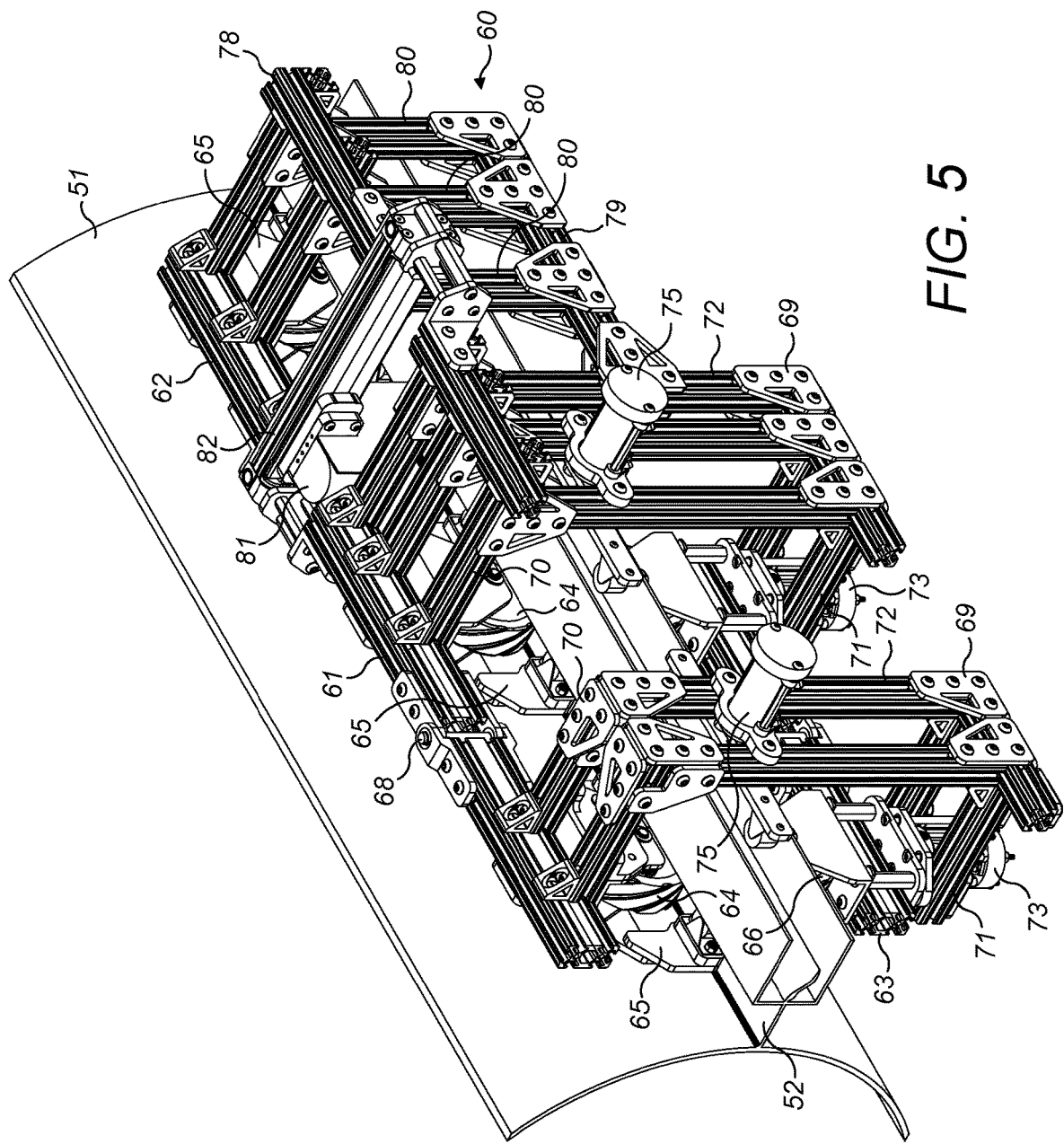
FIG. 5 shows a schematic isometric view of a production flange trimming apparatus.
Figure 6:
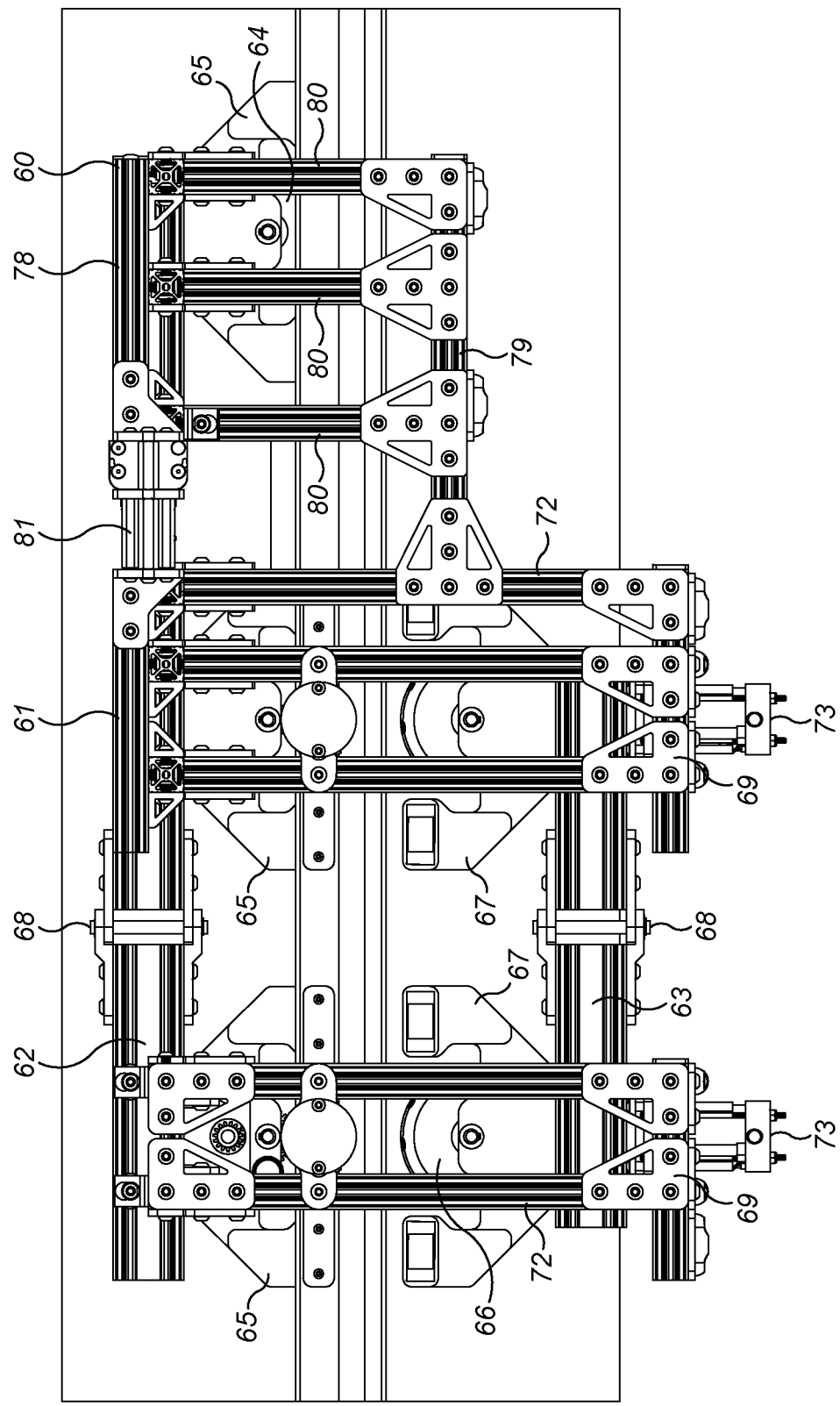
FIG. 6 shows a schematic plan view of the production flange trimming apparatus of FIG. 5.

FIG. 4c shows a schematic sectional view of an example de-moulded blade shell moulding 50 which comprises a central portion 51 located between two outboard spanwise extending production flanges 52. In the final production steps, the production flanges 52 may be trimmed from the blade shell moulding 50 so that substantially only the central portion 51 remains. The central portion 51 may then be polished and coated to form the wind turbine blade 10.

Throughout the description it will be understood that "inboard" and "outboard" are with respect to the central portion 51 of the blade shell moulding 50 which forms the final wind turbine blade 10 such that "inboard" means closer to the central portion 51 and/or wind turbine blade 10, and "outboard" means further from the central portion 51 and/or wind turbine blade 10.

FIGS. 5 to 8 show a schematic isometric view of one example of a self-propelled production flange trimming apparatus 60 when mounted on a production flange 52 of a blade shell moulding 50. The apparatus 60 may comprise a carriage 61 which may support one or more drive members, a directional control system and/or one or more cutting tools as will be described in detail below. It will be understood that the apparatus 60 described with reference to FIGS. 5 to 8 is an example only and that many other configurations are possible without departing from the scope of the invention as defined by the claims which follow.

In the example embodiment of FIGS. 5 to 8, the carriage 61 may comprise an upper support beam 62. The carriage 61 may also comprise a lower support beam 63. Wherein "upper" and "lower" refer to the relative positions of the support beams 62, 63 in use when the apparatus 60 is mounted on the production flange 52 of a blade shell moulding 50.

The upper support beam 62 may be longer than the lower support beam 63 such that one end of the upper support beam 62 projects beyond one end of the lower support beam 63. The upper support beam 62 may support three upper caster wheels 64. The upper caster wheels 64 may be supported by the upper support beam 62 via upper caster wheel carrier plates 65. The lower support beam 63 may support to two lower caster wheels 66. The lower caster wheels may be supported by the lower support beam 63 via lower caster wheel carrier plates 67.

Two of the upper caster wheels 64 and two of the lower caster wheels 66 may by arranged in opposing pairs such that two of the upper caster wheels 64 are located substantially vertically above corresponding lower caster wheels 66. The remaining upper caster wheel 64, if present, may be located on the portion of the upper support beam 62 which may project beyond the end of the lower support beam 63.

The upper support beam 62 and the lower support beam 63 may each comprises a hinge 68 located substantially vertically in line with one another. Each hinge 68 may be located between two opposing pairs of upper and lower caster wheels 64, 66, e.g. so that a first opposing pair of caster wheels and a second opposing pair of caster wheels are able to define different propagation directions due to the hinged connection between pairs of caster wheels. The hinges 68 may allow the carrier 61 to articulate so that it may maintain an amount of compliance to any spanwise curve of the spanwise extending production flange 52 in use. The hinge axis may be perpendicular or substantially perpendicular to the rotation axis of the caster wheels 64, 66.

Two C-shaped piston support brackets 69 may be supported from the upper support beam 62. Upper end portions 70 of the C-shaped piston support brackets 69 may be connected to the upper support beam 62. The lower end portions 71 of the C-shaped piston support brackets 69 may be connected to the lower support beam 63. Central portions 72 of the C-shaped piston support brackets 69 may extend between the upper end portions 70 and the lower end portions 71 of the C-shaped piston support brackets 69 outboard of the upper and lower support beams 62, 63. Central portions 72 of the C-shaped piston support brackets 69 may be located at a distance from the upper and lower support beams 62, 63 sufficient to enable the production flange 52 of a blade shell moulding 50 to be received within the space between the upper and lower support beams 62, 63 and the central portions 72 of the C-shaped piston support brackets 69 in use. The C-shaped piston support brackets 69 may form part of the carriage 61.

The lower end portions 71 of the C-shaped piston support brackets 69 may each support a pneumatic piston 73. The pneumatic pistons 73 may be located at the inboard ends of the lower end portions 71 of the C-shaped piston support brackets 69. The pneumatic pistons 73 may be operatively attached to the lower support beam 63. The pneumatic pistons 73 may be arranged to move the lower support beam 63 towards and away from the upper support beam 62 in use.

One or more of the upper caster wheel carrier plates 65 may support a pair of upper inboard follower wheels 84 which may be positioned one on either side of the upper caster wheels 64. The upper inboard follower wheels 84 may be smaller than the upper caster wheels 64. The upper inboard follower wheels 84 may be orientated such that, in use, they have a substantially vertical axis of rotation.

One or more of the lower caster wheel carrier plates 67 may support a pair of lower inboard follower wheels 85 which may be positioned one on either side of the lower caster wheels 66. The lower inboard follower wheels 85 may be smaller than the lower caster wheels 66. The lower inboard follower wheels 85 may be orientated such that, in use, they have a substantially vertical axis of rotation.

Accordingly, the upper inboard follower wheels 84 are rigidly arranged relative to the upper caster wheels 64—in this example since both the upper inboard follower wheels 84 and the caster wheels 64 are fixed to the caster wheel carrier plates 65. Similarly, the lower inboard follower wheels 85 are rigidly arranged relative to the lower caster wheels 66—in this example since both the lower inboard follower wheels 85 and the caster wheels 66 are fixed to the caster wheel carrier plates 67.

The upper inboard follower wheels 84 and/or the lower inboard follower wheels 85 will follow any curvature of the first surface portion/web portions 39, 39' of the flange 52 due to the clamped effect of the two opposite follower wheels 84, 77 on opposite sides of the first surface portion/web portions 39, 39' of the production flange and will therefore control the driving direction of the caster wheels 64, 66 along the bond portion 37, 37'. Accordingly, the apparatus 60 is controlled to follow a curvature of the bond portion 37, 37' such as a curvature in the chord plane of the blade since the follower wheels will track at least chord wise curvature changes of the first surface portion/web portions 39, 39'.

The vertical axis of rotation of each of the follower wheels 84, 85, 77 may be mutually parallel or substantially parallel and may be arranged perpendicular or substantially perpendicular to the rotation axes of the caster wheels 64. The hinge axis of the hinge 68 may be parallel or substantially parallel to the rotation axis of the follower wheels 84, 85, 77.

Follower wheels 84, 85, 77 may be arranged in association with opposing pairs of caster wheels, e.g. so that two, three or more follower wheels configured to be operating on opposite sides of the web portions 39 and/or the production flange 52 are arranged associated with and in the vicinity of an opposing pair of caster wheels. Particularly, a first drive assembly comprising a group of two or more follower wheels arranged associated with a pair of opposing caster wheels may be connected via a hinge or hinges 68 to a second drive assembly comprising a group of other two or more follower wheels arranged associated with another pair of opposing caster wheels. Accordingly, since hinges of the follower wheels are parallel with the hinges 68, for any curvature in the spanwise direction, the follower wheels will follow the curvature and will control the caster wheels 64, 66 to follow the curvature. In a configuration without hinges, the follower wheels will similarly follow the curvature and therefore control the caster wheels 64, 66 to follow the curvature, e.g. via some resilience provided e.g. in the longitudinal direction of the outboard pneumatic piston 76.

Figure 8:
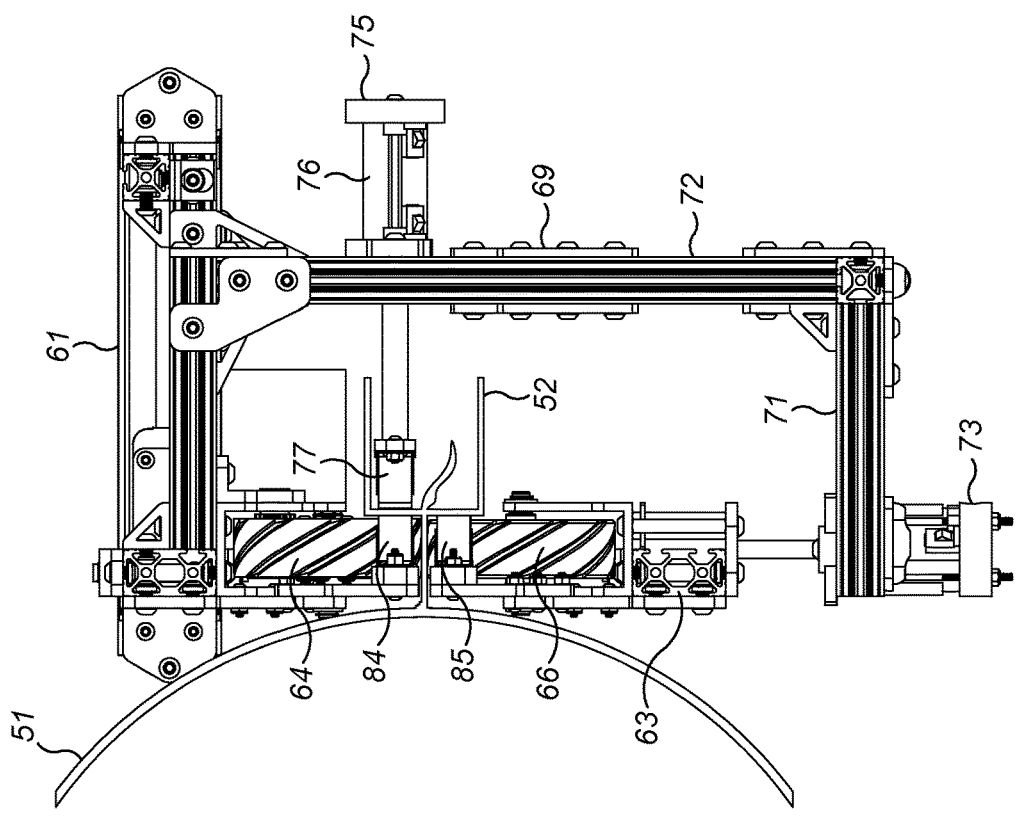
FIG. 8 shows a schematic side view of the production flange trimming apparatus of FIG. 5 in a closed configuration.
Figure 7:
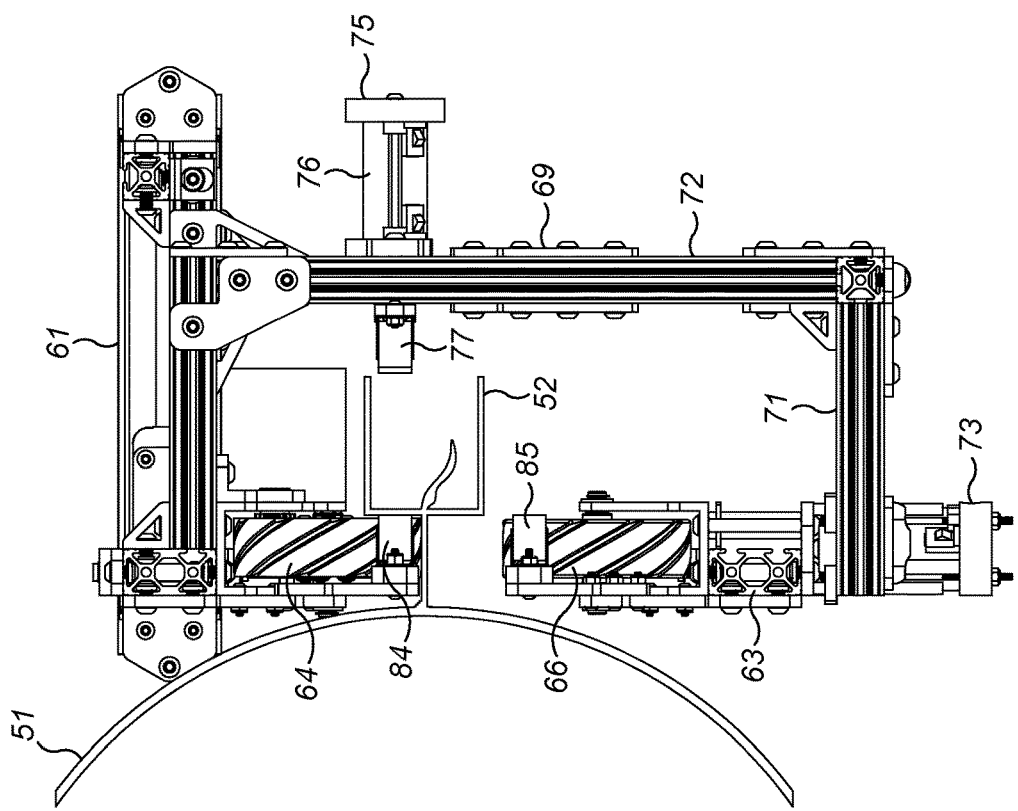
FIG. 7 shows a schematic side view of the production flange trimming apparatus of FIG. 5 in an open configuration.

One or more of the central portions 72 of the C-shaped piston support brackets 69 may carry an outboard piston assembly 75. As best shown in FIGS. 7 and 8, the outboard piston assembly 75 may comprise an outboard pneumatic piston 76. An outboard follower wheel 77 may be mounted on the outboard pneumatic piston 76. The outboard pneumatic piston 76 may be configured to move the outboard follower wheel 77 towards and away from the production flange 52 of the blade shell moulding 50 in use. The or each outboard piston assembly 75 may be positioned so that its respective outboard follower wheel 77 is positioned substantially between a pair of upper follower wheels 84 which are supported by an opposing upper wheel carrier plates 65. The or each outboard piston assembly 75 may be positioned so that its respective outboard follower wheel 77 is positioned substantially at the same height as the upper follower wheels 84.

Alternatively or additionally, one or more outboard piston assemblies 75 may be positioned so that their respective outboard follower wheel 77 is positioned substantially between a pair of lower follower wheels 85 which are supported by an opposing lower wheel carrier plates 67. Each outboard piston assembly 75 may be positioned so that its respective outboard follower wheel 77 is positioned substantially at the same height as the lower follower wheels 85.

An upper cutting tool support beam 78 may be supported by the portion of the upper support beam 62 which may extend beyond the lower support beam 63. The upper cutting tool support beam 78 may be positioned so that it is substantially in line with the upper end portions 70 of the C-shaped piston support brackets 69. A lower cutting tool support beam 79 may be located substantially vertically below the upper cutting tool support beam 78. One end of the lower cutting tool support beam 79 may be supported by the central portion 72 of an adjacent C-shaped piston support bracket 69. The lower cutting tool support beam 79 may be additionally supported by vertical support beams 80 which may depend from the upper cutting tool support beam 78. The upper and lower cutting tool support beams 78, 79, and the vertical support beams 80, may form part of the carriage 61.

A cutting tool 81 may be operatively attached to a pneumatic slide 82. The pneumatic slide 82 may be supported between the upper support beam 62 and the upper cutting tool support beam 78. In one example the cutting tool may be an end mill. However, any cutting tool suitable for cutting the production flange 52 from the blade shell moulding 50 may be used. Examples include rotary, band and reciprocating saws, oscillators and contactless cutting systems such as laser, plasma and electron bean cutting systems.

In an alternative example, the cutting tool 81 may be operatively connected to the upper support beam 62 only. The upper and lower cutting tool support beams 78, 79, the vertical support beams 80, and/or the pneumatic slide 82 may be dispensed with. In a further alternative example, the self-propelled flange trimming apparatus 60 may comprise more than one cutting tool 81 operatively mounted on the carrier 61. The one or more other cutting tools may be configured to perform a number of cutting operations in tandem with and/or in succession to the cutting operation carried out by the cutting tool 81 (to be described in further detail below).

FIG. 7 shows a schematic side view of the example flange trimming apparatus 60 in an open configuration. In this configuration the pneumatic pistons 73 may be operated to cause the lower caster wheels 66 to be in their retracted, or open, positions. Similarly, the outboard pneumatic pistons 76 may be operated to cause the outboard follower wheels 77 to be in their retracted, or open, positions. When in this configuration the flange trimming apparatus 60 may be readily placed onto the spanwise extending production flange 52 of the blade shell moulding 50. This may be done manually or with the aid of manual or robotic lifting equipment.

FIG. 8 shows a schematic side view of the example flange trimming apparatus 60 in a closed configuration. With the flange trimming apparatus 60 placed on the spanwise extending production flange 52 the pneumatic pistons 73 may be operated to cause the lower caster wheels 66 to move into their extended, or closed, positions as shown in FIG. 8. Similarly, the outboard pneumatic pistons 76 may be operated to cause the outboard follower wheels 77 to move into their extended, or closed, positions as shown in FIG. 8.

When mounted in the closed configuration on the spanwise extending production flange 52 of the blade shell moulding 50, the upper caster wheels 64 of the apparatus 60 may rest on the bond portion 37' of the upper production flange moulding 36'. Similarly, the upper follower wheels 84 may bear against the web portion 39' of the upper production flange moulding 36'.

As best shown in FIGS. 7 and 8, the anti-drop out portions 38', 38 of the upper 36' and lower 36 production flange mouldings (which together form the production flange 52) may be received in a space inboard of the central portions 72 of the C-shaped piston support brackets 69. In addition, the piston 76 mounted follower wheels 77 may bear against the opposite side of the web portion 39' of the upper production flange moulding 36' to the upper follower wheels 84.

When in the closed configuration (as shown in FIG. 8) the lower caster wheels 66 of the apparatus 60 may contact the bond portion 37 of the lower production flange moulding 36. Similarly, the lower follower wheels 85 may bear against the web portion 39 of the lower production flange moulding 36.

The bond portion 37' of the upper production flange moulding 36' may be thought of as a rail along which the upper caster wheels 64 may travel in use. Similarly, the bond portion 37 of the lower production flange moulding 36 may be thought of as a rail along which the lower caster wheels 66 may travel in use. In examples in which one or both of the upper 36' and/or lower 36 flange moulding comprise web portions 39', 39, the bond portions 37', 37 together with the web portions 39', 39 respectively may form a trough 55,' 55 (see FIG. 4c) along which the upper and/or lower caster wheels 64, 66 may travel in use.

At least one of the upper 64 and/or lower 66 caster wheels may be driven by a power source to cause the production flange trimming apparatus 60 to travel along the spanwise length of the production flange 52 of the blade shell moulding 50 in use. The driven caster wheel or wheels 64, 66 may comprise a high friction surface, or may be made from a high friction material, to maximise grip between the driving caster wheel(s) 64, 66 and the bond portion 37', 37 of the production flange mouldings 36', 36. Non-driven caster wheels 64, 66 (if present) may also be provided with a high friction surface if desired. In an example embodiment, the driven caster wheels 64, 66 may be the upper and lower caster wheels 64, 66 which are arranged in two opposing pairs. The driven caster wheel or wheels 64, 66 may be referred to as a drive system comprising one or more drive members 64, 66 which are configured to operatively engage the production flange 52 to drive the trimming apparatus 60 along the spanwise length of the production flange 52 in use.

As the production flange trimming apparatus 60 moves along the spanwise length of the production flange 52 of the blade shell moulding 50, one or more of the follower wheels 84, 85, 77 may follow the web portions 39', 39 of the upper and/or lower production flange mouldings 36', 36. One or more of the follower wheels 84, 85, 77 may be attached to the carrier 61 by one or more substantially rigid links such that the progress of the apparatus 60 along the production flange 52 is controlled by the one or more follower wheels 84, 85, 77. The one or more follower wheels 84, 85, 77 and their connections to the carrier 61 may thereby comprise a directional control system in which the one or more follower wheels 84, 85, 77 comprise detectors for detecting a characteristic of the production flange 52, and the one or more connections between the one or more follower wheels 84, 85, 77 to the carrier 61 comprise actuators for controlling the direction of the production flange trimming apparatus 60 in dependence on the characteristic of the production flange as detected by the one or more follower wheels 84, 85, 77.

In other words, in this example, the follower wheels 84, 85, optionally only one follower wheel, and the caster wheels 64, 66 are rigidly connected, e.g. by means of the upper and lower caster wheel carrier plates 65, 67. Thereby, a change of curvature of the flange 52 such as a chord wise change of curvature will cause the follower wheels 84, 85 to follow the flange curvature since the follower wheels are forced to bear against the web portions 39, 39' due to the clamping of the follower wheels 84, 85 and the opposite follower wheel 77 against the web portions 39, 39' provided by the force of the piston 76. Thereby, the follower wheels 84, 85, 77 control the driving direction of the caster wheels 64, 66 and thereby the progress of the apparatus 60 dependent on characteristics of the wind turbine blade 10 such as the curvature of the web portions 39, 39'.

The upper inboard follower wheels 84 and/or the lower inboard follower wheels 85 will follow any curvature of the bond portion 37, 37' of the flange 52, or at least chord wise curvatures, via the clamping effect of the two oppositely arranged follower wheels 84, 77 on opposite sides of the bond portions and will therefore control the driving direction of the caster wheels 64, 66.

The apparatus 60 therefore comprises a directional control system configured to control the direction of the apparatus 60 by following a first surface portion/web portion 39, 39' of the production flange 52 with a follower mechanism 84, 77.

The follower mechanism 84, 77 comprises at least two follower wheels 84, 77 configured to bear against opposite sides of the first surface portion/web portion 39, 39'. The two follower wheels may be arranged so that centre planes of the wheels normal to the rotation axes are coincident.

In an example, the directional control system comprises the follower mechanism 84, 77, i.e. the at least two follower wheels 84, 85, 77.

As the flange trimming apparatus 60 is driven or propelled along the production flange 52 in use the cutting tool 81 may operate to cut the production flange 52 from the central portion 51 of the blade shell moulding 50. The flange trimming apparatus 60 may travel from the root end of the blade shell moulding 50 towards the tip end of the blade shell moulding 50. Alternatively, the flange trimming apparatus 60 may travel from the tip end of the blade shell moulding 50 towards the root end. The flange trimming apparatus may move such that opposed pairs of caster wheels 64, 66 lead and the single upper caster wheel 64 follows. Alternatively, the flange trimming apparatus may move such that the single upper caster wheel 64 leads and the opposed pairs of caster wheels 64, 66 follow.

When the flange trimming apparatus 60 is being mounted on the production flange 52 of the blade shell moulding 50, the cutting tool 81 may be positioned on the outboard side of the pneumatic slide 82 so that it does not impinge on the production flange 52 until the apparatus 60 is ready to operate. Once the flange trimming apparatus 60 is mounted on the production flange 52, the cutting tool 81 may be operated and moved in an inboard direction on the pneumatic slide 82 so that it cuts through the production flange 52 until it is at the position required for removal of the production flange 52. When the cutting tool 81 has reached this position, the flange trimming apparatus 60 may be operated to progress along the production flange 52 to cause the cutting tool 81 to cut through the production flange 52 and separate it from the central portion 51 of the blade shell moulding 50.

Once the flange trimming apparatus 60 has travelled a certain distance, the progress of the flange trimming apparatus 60 may be stopped or paused and the cutting tool 81 operated and simultaneously moved in an outboard direction so that it may cut the portion of the production flange 52 which has been separated from the central portion 51 of the blade shell moulding 50 from the portion of the production flange 52 which remains attached to the blade shell central portion 51 of the moulding 50.

In an alternative method, a slot may be pre-cut into the production flange 52 for receiving the cutting tool 81 when the flange trimming apparatus 60 is mounted on the production flange 52. In a further alternative, the flange trimming apparatus 60 may be fed onto one end of the production flange 52 or fed onto an end of the production flange 52 which remains after an upstream—relative to the direction of travel of the flange trimming apparatus 60—portion of the production flange 52 has been removed.

As mentioned above, the flange trimming apparatus 60 may comprise more the one cutting tool 81. In one example, the flange trimming apparatus 60 may comprise a first cutting tool mounted upstream—relative to the direction of travel of the flange trimming apparatus 60—of a second cutting tool, where the first cutting tool is configured and positioned to make a first cut through the production flange 52 at a first distance outboard of the central portion 51 of the blade shell moulding 50. The second cutting tool may be configured and positioned to make a second cut through the production flange 52 at a second distance outboard of the central portion 51 of the blade shell moulding 50. The first distance may be greater than the second distance. In such an arrangement, a preliminary rough cut may be made before a more refined second cut is made. The first and second cuts may be made by different types of cutting tool. In one example, the first cut may be made by a saw. The second cut may be made by a mill.

The or each cutting tool may be mounted on a pneumatic slide such as the pneumatic slide 82 described above with reference to FIGS. 5 to 8. Alternatively, the or each cutting tool may be mounted in a fixed position on the carrier 61. Where more than one cutting tool is present, one or more of the cutting tools may be mounted on mobile mountings such as a pneumatic slide. Other cutting tools may be mounted in a fixed position on the carrier 61. Other types of mobile tool mountings may be used other than slides. For example, the cutting tool or tools may be mounted on pistons, articulated arms or the like.

To guard against the flange trimming apparatus 60 unintentionally driving itself off the end of the production flange 52, a sensor apparatus may be provided to sense an end of the production flange in front of the flange trimming apparatus 60 in the direction of travel. In one example, the sensor may comprise a spring-loaded arm configured so that a first end of the arm rides on the production flange 52 ahead of the flange trimming apparatus 60. The second end of the arm may be held away from a switch configured to disable the drive member(s) 64, 66 upon contact of the second end of the arm with the switch. Should the first end of the arm ride over the edge of the production flange 52. The switch may be contacted by the second end of the arm and the progress of the flange trimming apparatus may be stopped. A brake may also be provided which may be configured to operate when the switch is contacted.

In an alternative example, a laser sensor may be provided at the front end of the flange trimming apparatus 60—relative to the direction of travel—wherein the laser sensor is configured to electronically cut power to the drive member(s) 64, 66 upon detection of the end of the production flange 52. As above a brake may be provided which may be configured to operate when the end of the production flange is detected.

Power may be provided to the various power consumers including the drive members 66, 64, the pistons 73, 75, the pneumatic slide 82, the cutting tool(s) 81, and/or a control system (when present) via hoses and/or electrical cabling as appropriate. Alternatively, portable power sources, such as batteries, may be mounted on the carrier 61. The power sources provided to the various power consumers mounted on the carrier 61 may supplied by a number of different means such that some of the power consumers are supplied by cable and/or hose from a remote power source, and other of the power consumers are supplied by a portable power source mounted on the carrier 61.

In the embodiment described above the pistons 73, 76 and slide 82 are described as pneumatic indicating that they are operated by pressurised air. The skilled person will understand that the pistons 73, 76 and slide 82 may be operated by any suitable fluid and may be hydraulic rather than pneumatic. In addition, the skilled person will understand that the fluid operated pistons 73, 76 and slide 82 may be substituted for any other suitable motive system such as a motor driven screw or similar.

The flange trimming apparatus 60 may be used to trim production flanges 52 which do not have anti-drop out portions 38', 38 or webs 39', 39. In such a case, the follower wheels 84, 85, 77 may be configured to ride along an outboard spanwise edge of the production flange 52. In such a case, larger follower wheels 84, 85, 77 may optionally be provided to help ensure consistent contact with the edge of the production flange 52. The skilled person will understand that any number and configuration of follower wheels 84, 85, 77 may be provided and that it is not necessary for the follower wheels to only follow the web 39', 39 or edge of the production flange 52. In one example the follower wheels 84, 85, 77 may be configured to follow the inboard edge of the production flange 52 where it meets the central portion 51 of the blade shell moulding 50. The skilled person will understand that the follower wheels 84, 85, 77 may be of any suitable size, orientation and location depending on the specific configuration of the production flange 52 to be cut.

Similarly, the skilled person will understand that any suitable size, configuration and number of caster wheels 64, 66 may be used. In particular, the skilled person will understand that the caster wheels 66, 64 need not be provided in opposing pairs and that any number of upper 64 and lower 66 caster wheels may be used depending on the specific configuration of the production flange 52 to be cut. One or more of the caster 64, 66 wheels may be driven.

In the example described above with reference to FIGS. 5 to 8, one set of hinges 68 are provided to provide a degree of compliance of the carrier 61 to any spanwise curve of the production flange 52. It will be understood that any number and configuration of hinges 68 may be used to provide the necessary degree of compliance depending on the configuration of the production flange 52 to be cut.

As an alternative, or in addition, to the follower wheel based directional control system described above with reference to FIGS. 5 to 8, the flange trimming apparatus 60 may comprise a laser directed control system comprising a laser projector and a camera for detecting the laser projected image. In one embodiment the laser projector may project a line which falls on the intersection between the central portion 51 of the blade shell moulding 50 and the production flange 52. The camera may be used to detect the projected line and to provide the detected image to a processor capable of determining the position of the flange trimming apparatus 60 along the length of the blade shell moulding 50 and or production flange 52, for example, by comparison to a known blade shell moulding 50 topography.

The processor may be configured to issue input signals to a controller which is in turn configured to issue control signals to one or more servo motors which are arranged to control the direction of the flange trimming apparatus 60 as it progresses along the production flange 52. This example directional control system therefore comprises a detector for detecting a characteristic of the wind turbine blade 10, 51 and the production flange 52, and an actuator for controlling the direction of the apparatus 60, wherein the actuator is configured to control the direction of the apparatus in dependence on the characteristic of the wind turbine blade 10, 51 and the production flange 52 as detected by the detector. In alternative embodiment, markings or other information may be provided on the central portion 51 of the blade shell moulding 50 and/or the production flange 52, which markings may be detected by the camera. The markings may include bar or QR codes or the like containing information concerning the location of the marking on the blade shell moulding 50.

The following numbered clauses set out examples of a production flange trimming apparatus 60 and a method for trimming a spanwise extending production flange 52.

Clause 1. An apparatus 60 for trimming a spanwise extending production flange 52 from a wind turbine blade 10 during manufacture of the wind turbine blade 10, the apparatus 60 comprising:

a carriage 61;

a cutting tool 81 operatively attached to the carriage 61;

one or more drive members 64, 66 operatively attached to the carriage 61, wherein the one or more drive members 64, 66 are configured to operatively engage a rail which extends in a spanwise direction along the wind turbine blade 10, wherein the rail comprises a first portion 67', 67 of the production flange 52; and a directional control system operatively attached to the carriage 61, wherein the directional control system comprises a detector for detecting a characteristic of the wind turbine blade 10 and/or the production flange 52, and an actuator for controlling the direction of the apparatus 60, wherein the actuator is configured to control the direction of the apparatus 60 in dependence on the characteristic of the wind turbine blade 10 and/or the production flange 52 as detected by the detector, wherein in use the cutting tool 81 is configured to cut through the production flange 52 to separate the production flange 52 from the wind turbine blade 10 as the apparatus 60 is driven along the rail by the one or more drive members.

Clause 2. The apparatus 60 of clause 1, wherein the detector is configured to detect a characteristic of the production flange 52 which is located outboard of the rail with respect to the wind turbine blade 10.

Clause 3. The apparatus 60 of clause 1 or 2, wherein the characteristic of the production flange 52 comprises a second portion of the production flange 52.

Clause 4. The apparatus 60 of clause 3, wherein the detector comprises a follower 84 which is configured to contact a first surface of the second portion of the production flange 52 in use, and wherein the actuator comprises a substantially rigid link between the follower 84, 85, 77 and the carriage 61.

Clause 5. The apparatus 60 of clause 4, wherein the directional control system comprises:

a second follower 77 which is configured to contact a second surface of the second portion of the production flange 52 in use; and a second actuator comprising a substantially rigid link between the second follower 77 and the carriage 61.

Clause 6. The apparatus 60 of clause 5, wherein in use the follower 84 and the second follower 77 are located on opposite sides of the second portion of the production flange 52.

Clause 7. The apparatus 60 of any one of clauses 4 to 6, wherein the directional control system comprises:
a third follower 85 which is configured to contact a third portion of the production flange 52 in use, wherein the third portion is located outboard of the rail with respect to the wind turbine blade 10; and
a third actuator comprising a substantially rigid link between the third follower 85 and the carriage 61.

Clause 8. The apparatus 60 of any one of clauses 4 to 7, wherein the follower, the second follower when present and/or the third follower when present, comprise a wheel.

Clause 9. The apparatus 60 of clause 8, wherein the one or more wheels comprise one or more of the drive members 64, 66.

Clause 10. The apparatus 60 of any one of clauses 3 to 9, wherein the rail is angled with respect to the second portion of the production flange 52.

Clause 11. The apparatus 60 of any one of clauses 2 to 10, wherein at least one of the one or more drive members 64, 66 engages the first surface portion 67', 67 of the production flange 52.

Clause 12. The apparatus 60 of any preceding clause, comprising one or more stabilisers operatively connected to the carriage 61, wherein the one or more stabilisers are configured to contact the wind turbine blade 10 and/or the production flange 52 in use, wherein preferably the one or more stabilisers comprise one or more wheels 64, 66.

Clause 13. The apparatus 60 of any preceding clause, wherein the carriage 61 comprises a hinge 68 configured to allow an amount of conformity between the apparatus 60 and any spanwise curve of the spanwise extending production flange.

Clause 14. The apparatus 60 of any preceding clause, comprising a second cutting tool operatively attached to the carriage 61, wherein the second cutting tool is configured to separate a first section of the production flange 52 from a second section of the production flange 52.

Clause 15. The apparatus 60 of preceding clause, wherein the cutting tool 81, and/or the second cutting tool when present, is attached to the carriage 61 by a connector 82 which is moveable with respect to the carriage 81.

Clause 16. The apparatus 60 of any preceding clause, wherein the apparatus 60 has a first open configuration suitable for use during placement of the apparatus 60 onto the production flange 52 and/or removal of the apparatus 60 from the production flange 52, and a second closed configuration suitable for use during a production flange 52 cutting operation.

Clause 17. The apparatus 60 of any preceding clause, wherein the one or more drive members 64, 66 and/or the cutting tool 81 or tools are configured to be operated by an on-board power source.

Clause 18. The apparatus 60 of any preceding clause, wherein the one or more drive members 64, 66 and/or the cutting tool 81 or tools are configured to be operated by a remote power source.

Clause 19. A method of removing the production flange 52 from a wind turbine blade 10, the method comprising:
attaching an apparatus 60 according to any preceding clause to the production flange 52;
operating the apparatus 60 to cause the apparatus 60 to travel along the spanwise direction of the production flange 52 and cut through the production flange 52 to separate a portion of the production flange 52 from the wind turbine blade 10; and
detaching the apparatus 60 from the production flange 52.

Clause 20. The method of clause 19, comprising:
stopping or pausing the travel of the apparatus 60; and
using a cutting tool 81 of the apparatus 60 to cut the separated portion of the production flange 52 from the remaining portion of the production flange 52.

Clause 21. The method of in clause 20, comprising re-starting travel of the apparatus 60 along the spanwise direction of the production flange 52.

The invention claimed is:

1. A method of trimming a spanwise extending production flange from a wind turbine blade during manufacture of the wind turbine blade, the method comprising:
mounting a self-propelled production flange trimming apparatus on a spanwise extending production flange of the wind turbine blade;
using a drive system of the apparatus comprising one more drive members configured to operatively engage the production flange to propel the apparatus along the spanwise length of the production flange;
using a directional control system of the apparatus to control the direction of the apparatus as it is propelled along the spanwise length of the production flange, wherein the controlling of the direction comprises following a first surface portion of the production flange with a follower mechanism of the apparatus, wherein the follower mechanism comprises at least two follower wheels configured to bear against opposite sides of the first surface portion; and
using a cutting tool of the apparatus to cut through the production flange to separate the production flange from the wind turbine blade as the apparatus is propelled along the spanwise length of the production flange.

2. The method as claimed in claim 1, wherein controlling the direction of the apparatus comprises detecting a characteristic of the wind turbine blade and/or the production flange and controlling the direction of the apparatus in dependence on the detected characteristic.

3. The method as claimed in claim 2, wherein detecting a characteristic of the production flange comprises detecting a characteristic of the production flange which is located on an outboard side of the production flange with respect to the wind turbine blade.

4. The method as claimed in claim 2, wherein detecting a characteristic of the production flange comprises detecting a first surface portion of the production flange.

5. The method as claimed in claim 4, wherein the first surface portion of the production flange is orientated at an angle with respect to a second surface portion of the production flange.

6. The method as claimed in claim 4, wherein detecting the first surface portion of the production flange comprises following the first surface portion of the production flange with a follower mechanism of the apparatus.

7. The method as claimed in claim 1, comprising detecting an end of the production flange and stopping propulsion of the apparatus upon detection of the end of the production flange.

8. The method as claimed in claim 1, comprising:
stopping or pausing propulsion of the apparatus along the spanwise length of the production flange; and cutting a portion of the production flange which has been separated from the wind turbine blade from a portion of the production flange that remains attached to the wind turbine blade.

9. The method as claimed in claim 8, comprising re-starting propulsion of the apparatus along the spanwise direction of the production flange.

10. A self-propelled wind turbine blade production flange trimming apparatus for trimming a spanwise extending production flange from a wind turbine blade during manufacture of the wind turbine blade, the apparatus comprising:
   a carriage;
   one or more drive members operatively attached to the carriage, wherein the one more drive members are configured to operatively engage the production flange to propel the apparatus along the spanwise length of the production flange in use;
   a directional control system operatively attached to the carriage, wherein the directional control system is arranged to control the direction of the apparatus by following a first surface portion of the production flange with a follower mechanism comprised by the apparatus, wherein the follower mechanism comprises at least two follower wheels configured to bear against opposite sides of the first surface portion; and
   a cutting tool operatively attached to the carriage.

11. The apparatus as claimed in claim 10, wherein the carriage comprises a hinge configured to allow a first side of the carriage to pivot with respect to a second side of the carriage.

12. The apparatus as claimed in claim 10, wherein the carriage has an open configuration suitable for use during placement of the apparatus onto the production flange of a wind turbine blade and/or removal of the apparatus from the production flange of the wind turbine blade, and a closed configuration suitable for use during a production flange cutting operation.

13. A system comprising:
   a wind turbine blade having a spanwise extending production flange; and
   the wind turbine blade production flange trimming apparatus of claim 10 mounted on the spanwise extending production flange of the wind turbine blade for trimming the spanwise extending production flange from a wind turbine blade during manufacture of the wind turbine blade.

14. The system as claimed in claim 13, wherein the directional control system comprises:
   a detector for detecting a characteristic of the wind turbine blade and/or the production flange; and
   an actuator, wherein the actuator is configured to control the direction of the apparatus in dependence on the characteristic of the wind turbine blade and/or the production flange as detected by the detector.

15. The system as claimed in claim 14, wherein the detector is configured to detect a first surface portion of the production flange, wherein the first surface portion of the production flange is contiguous with a second surface portion of the production flange, and wherein the first and second surface portions of the production flange are orientated at an angle with respect to one another.

\* \* \* \* \*